(12) United States Patent
Saitou

(10) Patent No.: US 10,017,625 B2
(45) Date of Patent: Jul. 10, 2018

(54) RUBBER COMPOSITION, CROSSLINKED RUBBER COMPOSITION AND TIRE

(71) Applicant: BRIDGESTONE CORPORATION, Chuo-ku, Tokyo (JP)

(72) Inventor: Kouichi Saitou, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 14/394,379

(22) PCT Filed: May 8, 2013

(86) PCT No.: PCT/JP2013/002970
§ 371 (c)(1),
(2) Date: Oct. 14, 2014

(87) PCT Pub. No.: WO2013/168424
PCT Pub. Date: Nov. 14, 2013

(65) Prior Publication Data
US 2015/0073067 A1 Mar. 12, 2015

(30) Foreign Application Priority Data
May 8, 2012 (JP) ................................. 2012-107066

(51) Int. Cl.
```
C08K 3/34      (2006.01)
C08K 3/36      (2006.01)
C01B 33/193    (2006.01)
C08K 9/04      (2006.01)
C09C 1/30      (2006.01)
B60C 1/00      (2006.01)
C09C 3/08      (2006.01)
C09C 1/28      (2006.01)
```
(52) U.S. Cl.
CPC .............. *C08K 3/36* (2013.01); *B60C 1/0016* (2013.01); *C01B 33/193* (2013.01); *C08K 9/04* (2013.01); *C09C 1/28* (2013.01); *C09C 1/3063* (2013.01); *C09C 3/08* (2013.01); *C01P 2006/12* (2013.01); *C08K 2201/006* (2013.01); *Y02T 10/862* (2013.01)

(58) Field of Classification Search
CPC ....... C08K 9/04; C08K 2201/006; C08K 3/36
See application file for complete search history.

(56) References Cited

U.S. PATENT DOCUMENTS

| | | | | |
|---|---|---|---|---|
| 5,714,533 A * | 2/1998 | Hatakeyama | ............. | B60C 1/00 524/140 |
| 6,294,624 B1 * | 9/2001 | Inoue | .................... | B60C 1/0016 524/262 |
| 6,736,891 B1 * | 5/2004 | Bice | ........................ | B82Y 30/00 106/287.1 |
| 7,790,798 B2 * | 9/2010 | Chen | ......................... | B60C 1/00 523/351 |
| 7,935,184 B2 * | 5/2011 | Fudemoto | ............ | C07D 233/58 106/415 |
| 9,279,045 B2 * | 3/2016 | Hoshino | .................... | B60C 1/00 |
| 9,447,208 B2 * | 9/2016 | Itoh | .......................... | C08K 3/36 |
| 2006/0229386 A1 | 10/2006 | Raman et al. | | |
| 2006/0281009 A1 * | 12/2006 | Boyer | ...................... | C08K 9/04 429/247 |
| 2011/0054116 A1 * | 3/2011 | Hoshino | ............... | B60C 1/0016 524/575.5 |
| 2015/0073067 A1 * | 3/2015 | Saitou | ................... | C01B 33/193 523/156 |
| 2017/0051134 A1 * | 2/2017 | Yamagishi | ................ | C08L 9/06 |

FOREIGN PATENT DOCUMENTS

| | | | |
|---|---|---|---|
| CN | 1277222 A | | 12/2000 |
| CN | 101230157 A | | 7/2008 |
| EP | 0392262 | * | 3/1990 |
| EP | 0392262 A2 | | 10/1990 |
| EP | 0733673 A1 | | 9/1996 |
| JP | 06-248116 A | | 9/1994 |
| JP | 11-130908 A | | 5/1999 |
| JP | 2005-502753 A | | 1/2005 |
| JP | 2007-238682 A | | 9/2007 |
| JP | 2010-59272 | * | 3/2010 |
| JP | 2010-059272 A | | 3/2010 |
| JP | 2012-107211 A | | 6/2012 |
| KR | 96-007760 B1 | | 6/1996 |
| WO | 2006/110424 A1 | | 10/2006 |
| WO | 2009/091057 A1 | | 7/2009 |

OTHER PUBLICATIONS

Ultrasil VN 3 Product information, http://www.quimicosypolimeros.com/admin/images/productos/datasheet/TECNICAL_DATA_SHEET_Ultracil_VN3.pdf, Mar. 2012.*
English machine translation of JP 2010-059272 to Ihara et al. Obtained from the AIPN/JPO website on Mar. 17, 2017.*
First Office Action dated Jun. 3, 2015 in corresponding Chinese Patent Application No. 201380023575.9 with translation.
International Search Report for PCT/JP2013/002970 dated Aug. 20, 2013.
Communication dated Dec. 7, 2015 from the State Intellectual Property Office of the P.R.C. in counterpart application No. 201380023575.9.
XP-002750850 WPI/Thomson, 2004. (4 pages total).

* cited by examiner

Primary Examiner — Michael A Salvitti
(74) Attorney, Agent, or Firm — Sughrue Mion, PLLC

(57) ABSTRACT

The present invention provides a rubber composition that can offer excellent abrasion resistance when applied to a tire member such as a tread, without deteriorating rolling resistance. To solve the problem, a rubber composition according to the present invention contains a rubber component, hydrous silicate, and a surfactant, in which the hydrous silicate is modified by the surfactant before being kneaded with the rubber component.

6 Claims, No Drawings

RUBBER COMPOSITION, CROSSLINKED RUBBER COMPOSITION AND TIRE

TECHNICAL FIELD

The present invention relates to a rubber composition that exhibits excellent abrasion resistance when applied to tire members as compared to the conventional art, and a tire using the same.

BACKGROUND ART

Generally, pneumatic tires are required to have so high performance as to meet multiple performance requirements at the same time. It is strongly desirable to have tire members such as treads, among others, that can reduce the rolling resistance of the tires and are excellent in abrasion resistance. There is a tradeoff between these properties, however, which have necessitated years and years of trial and error to date.

Rubber compositions applied to tire treads use hydrous silicate as a reinforcing filler. In general, as the content of hydrous silicate increases, the abrasion resistance of the tire improves to some extent, yet the rolling resistance may deteriorate. In some cases, the viscosity of unvulcanized rubber increases more than is required, which may result in reduced workability.

Under such circumstances, silane coupling agents have been developed to solve the aforementioned problem, but a sufficient degree of silica dispersion has not been achieved yet, which makes it difficult to provide good dispersion of silica particles in industrial terms.

Thus, in order to obtain further improved dispersibility of silica, JPH06248116A (PTL 1) discloses a technique for promoting reaction of a silane coupling agent by kneading therewith silica particles having surfaces treated with a hydrophobizing agent.

In addition, WO2009091057A1 (PTL 2) discloses a technique for improving the abrasion resistance and reinforcing capability of a rubber composition by including hydrous silicate with a particular structure contained in the rubber composition.

CITATION LIST

Patent Literature

PTL 1: JPH06248116A
PTL 2: WO2009091057A1

SUMMARY OF INVENTION

Technical Problem

The techniques disclosed in PTL 1 and PTL 2 achieves a certain level of dispersibility of silica, which is, however, not sufficient. There is thus a demand for a further improvement of abrasion resistance of rubber compositions.

Therefore, an object of the present invention is to provide a rubber composition that can offer excellent abrasion resistance when applied to a tire member such as a tread, without deteriorating the performance such as rolling resistance, a crosslinked rubber composition formed by crosslinking the rubber composition, and a tire produced by using either of the compositions as material.

Solution to Problem

The inventors of the present invention intensely investigated how to resolve the above problems. As a result, the inventors found that inclusion of hydrous silicate and a surfactant to a rubber composition, and addition of the surfactant to the hydrous silicate so as to be modified with the surfactant before being kneaded with the aforementioned rubber component may provide high dispersibility of the hydrous silicate as compared to the conventional art, resulting in excellent abrasion resistance without deteriorating the performance such as rolling resistance. The present invention was completed on this finding.

The present invention was made based on these discoveries and the gist thereof is as follows:

1. A rubber composition obtained by blending a rubber component, hydrous silicate, and a surfactant, wherein the hydrous silicate is modified by the surfactant before being kneaded with the rubber component.
2. The rubber composition according to aspect 1 above, wherein the hydrous silicate has a carbon content of 1 mass % or less.
3. The rubber composition according to aspect 1 above, wherein the surfactant is a nonionic surfactant.
4. The rubber composition according to aspect 1 above, wherein the surfactant is a cationic surfactant.
5. The rubber composition according to aspect 1 above, wherein the content of the surfactant to modify the hydrous silicate is 0.05 parts by mass to 1.0 parts by mass per 100 parts by mass of the hydrous silicate.
6. The rubber composition according to aspect 1 above, wherein the hydrous silicate has a cetyltrimethylammonium bromide (CTAB) adsorption specific surface area of 50 m$^2$/g to 300 m$^2$/g.
7. The rubber composition according to aspect 1 above, wherein the content of the hydrous silicate is 10 parts by mass to 150 parts by mass per 100 parts by mass of the rubber component.
8. The rubber composition according to aspect 1 above, wherein the rubber component is at least one rubber selected from natural rubber and diene-based synthetic rubber.
9. A crosslinked rubber composition obtained by crosslinking the rubber composition according to aspect 1 above.
10. A tire produced by using the rubber composition according to aspect 1 above or the crosslinked rubber composition according to aspect 9 above as material.

Advantageous Effect of Invention

According to the present invention, it is possible to provide a rubber composition that offers excellent abrasion resistance without deteriorating rolling resistance and a crosslinked rubber composition obtained by crosslinking the rubber composition. Thus, a high-performance pneumatic tire having excellent abrasion resistance as compared to the conventional art may be provided by using the rubber composition or the crosslinked rubber composition as material.

DESCRIPTION OF EMBODIMENTS

The present invention will now be described in detail below.

(Rubber Composition)

A rubber composition according to the present invention is obtained by blending a rubber component and hydrous silicate.

<Rubber Component>

No particular limitation is placed on the rubber component contained in the rubber composition. Preferably, from the viewpoint of obtaining excellent abrasion resistance, natural rubber and diene-based synthetic rubber may be used alone or in combination. Examples of such diene-based synthetic rubber include polyisoprene rubber (IR), styrene butadiene rubber (SBR), polybutadiene rubber (BR), and the like. Among these, preferred is styrene butadiene rubber (SBR). Note that these types of diene-based synthetic rubber may be used alone or as a blend of two or more.

<Hydrous Silicate>

Again, no particular limitation is placed on the aforementioned hydrous silicate. Examples thereof include wet silica, colloidal silica, calcium silicate, and aluminum silicate. Among these, the hydrous silicate is preferably wet silica. This is because wet silica has a profound effect on improving dispersibility.

Moreover, the hydrous silicate preferably has a cetyltrimethylammonium bromide (CTAB) adsorption specific surface area of 50 $m^2/g$ to 300 $m^2/g$. The reason is that if the CTAB adsorption specific surface area is less than 50 $m^2/g$, the storage elastic modulus of the rubber composition may significantly decrease, and if the CTAB adsorption specific surface area is more than 300 $m^2/g$, the viscosity of the rubber composition in an unvulcanized state may increase.

As used herein, the term "cetyltrimethylammonium bromide (CTAB) adsorption specific surface area" means the specific surface area ($m^2/g$) of hydrous silicate that is calculated from the amount of CTAB adsorbed on a hydrous silicate surface. The CTAB adsorption specific surface area may be measured as per the ASTMD 3765-92 method. The ASTMD 3765-92 method is used with a slight modification, as it is designed for use in measurement of CTAB adsorption specific surface areas for carbon black. Specifically, a CTAB standard solution is prepared in place of a standard carbon black product, to thereby standardize a hydrous silicate OT (di-2-ethylhexyl sodium sulfosuccinate) solution and calculate the specific surface area from the amount of adsorption of CTAB, assuming that the cross-sectional area of each CTAB molecule adsorbed on a hydrous silicate surface is 0.35 $nm^2$.

The content of the hydrous silicate is preferably 10 parts by mass to 150 parts by mass, and more preferably 30 parts by mass to 100 parts by mass, per 100 parts by mass of the rubber component. If the content of the hydrous silicate is less than 10 parts by mass, the resulting tire may suffer a deterioration in abrasion resistance. On the other hand, if the content of the hydrous silicate exceeds 150 parts by mass, rubber workability may decrease and the rubber composition may have poor low heat generation property, causing a deterioration in rolling resistance.

Note that no particular limitation is placed on the method of kneading the rubber component with the hydrous silicate. For example, the rubber component may be kneaded with the hydrous silicate using an open type kneader such as a roll, an internal mixer such as a Banbury mixer, and the like.

<Surfactant>

Moreover, the rubber composition according to the present invention is obtained by further blending a surfactant, wherein the hydrous silicate is modified by the surfactant before being kneaded with the rubber component. The surfactant contained in the rubber composition allows for improving the dispersibility of the hydrous silicate in the rubber composition, which may provide excellent abrasion resistance without impairing rolling resistance.

Here, the reason why the hydrous silicate is modified by the surfactant before being kneaded with the rubber component is that the dispersibility of the hydrous silicate can then be improved effectively by addition of a small amount of the surfactant.

Note that the surfactant may be added at any time, including, but not limited to, in the step of producing the hydrous silicate in the reaction vessel, the step of performing filtration and water washing at a filter press, the step of preparing a slurry from a wet cake with an emulsification device, and the step of making a slurry from the dried hydrous silicate, as long as the surfactant is added before being mixed with the rubber composition.

This is because if the surfactant is added at the time when the hydrous silicate is kneaded with the rubber component, the rubber component and other additives inhibit the adsorption of the surfactant on the hydrous silicate surface, with the result that a larger amount of the surfactant will be required for improving dispersibility. When the surfactant is added in a large amount at the time when the hydrous silicate is kneaded with the rubber component, the rubber composition suffers a low-loss performance degradation.

No particular limitation is placed on the method of modifying the hydrous silicate with the surfactant, and the modification, for example, may be performed by adding the surfactant during the process of producing the hydrous silicate.

Here, the content of the surfactant used to modify the hydrous silicate is preferably in the range of 0.05 parts by mass to 1.0 parts by mass, and more preferably in the range of 0.1 parts by mass to 0.8 parts by mass, per 100 parts by mass of the hydrous silicate. The reason is that if the content of the surfactant is less than 0.05 parts by mass, it may be too small to achieve sufficient improvement of dispersibility of the hydrous silicate, and if the content exceeds 1.0 parts by mass, it may shorten the scorch time of the compounded rubber, causing workability to deteriorate.

In addition, the surfactant may include, without limitation, a nonionic surfactant, a cationic surfactant, an anionic surfactant, and an amphoteric surfactant. Preferred among these are a nonionic surfactant and a cationic surfactant. The reason is that they can perform modification more easily on the hydrous silicate surface and thus can provide high improving effect on the dispersibility of the hydrous silicate.

A nonionic surfactant is a surfactant that has a hydrophilic group not ionized when dissolved in water, including, but not limited to, polyethylene glycol alkyl ether, polyethylene glycol fatty acid ester, alkyl glucoside, fatty acid alkanolamide, glycerin fatty acid ester, alkyl glyceryl ether, sorbitan fatty acid ester, polyethylene glycol sorbitan fatty acid ester, and sucrose fatty acid ester.

The cationic surfactant is a surfactant that generates positive ions when dissolved in water, including, but not limited to, a primary amine salt, a secondary amine salt, a tertiary amine salt, a quaternary ammonium salt, and a pyridinium salt.

<Coupling Agent>

It is desirable that the rubber composition according to the present invention is obtained by further blending a coupling agent in an amount of 1 parts by mass to 20 parts by mass, preferably 3 parts by mass to 16 parts by mass, and more preferably 5 parts by mass to 12 parts by mass, per 100 parts by mass of the aforementioned hydrous silicate. Blending 1 parts by mass or more of the coupling agent per 100 parts by mass of the hydrous silicate allows for further increasing the effect caused by blending the hydrous silicate and further improving physical properties of the rubber composition, such as low heat generation property and storage elastic modulus. On the other hand, blending over 20 parts by mass of the coupling agent cannot increase the effect of improving low heat generation property, storage elastic modulus and the like, leading to increasing costs.

Preferred examples of the aforementioned coupling agent include a compound represented by Formula (IV):

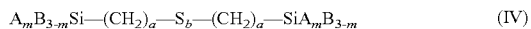

$$A_mB_{3-m}Si-(CH_2)_a-S_b-(CH_2)_a-SiA_mB_{3-m} \quad (IV)$$

[where A, B, m, a, and b are as defined above], a compound represented by Formula (V):

$$A_mB_{3-m}Si-(CH_2)_c-Y \quad (V)$$

[where A, B, Y, m, and c are as defined above], a compound represented by Formula (VI):

$$A_mB_{3-m}Si-(CH_2)_a-S_b-Z \quad (VI)$$

[where A, B, Z, m, a, and b are as defined above], and a compound represented by Formula (VII):

$$R^1{}_xR^2{}_yR^3{}_zSi-R^4-S-CO-R^5 \quad (VII)$$

[where $R^1$, $R^2$, $R^3$, $R^4$, $R^5$, x, y, and z are as defined above].

These coupling agents may be used alone or in combination of two or more.

Examples of the compound represented by Formula (IV) include bis(3-triethoxysilylpropyl)tetrasulfide, bis(3-trimethoxysilylpropyl)tetrasulfide, bis(3-methyldimethoxysilylpropyl)tetrasulfide, bis(3-triethoxysilylethyl)tetrasulfide, bis(3-triethoxysilylpropyl)disulfide, bis(3-trimethoxysilylpropyl)disulfide, and bis(3-triethoxysilylpropyl)trisulfide.

In addition, examples of the compound represented by Formula (V) include 3-mercaptopropyltrimethoxysilane, 3-mercaptopropyltriethoxysilane, vinyltriethoxysilane, vinyltrimethoxysilane, 3-aminopropyltriethoxysilane, 3-aminopropyltrimethoxysilane, 3-mercaptopropylmethyldimethoxysilane, γ-glycidoxypropyltrimethoxysilane, and γ-glycidoxypropylmethyldiethoxysilane. Commercially available products thereof include, for example, trade name "VP Si363," manufactured by Evonik Degussa Corporation.

Moreover, examples of the compound represented by Formula (VI) include 3-trimethoxysilylpropyl-N,N-dimethylcarbamoyltetrasulfide, 3-trimethoxysilylpropylbenzothiazolyltetrasulfide, and 3-trimethoxysilylpropylmethacryloylmonosulfide.

In addition, regarding the compound represented by Formula (VII), $R^2$, $R^5$, $R^6$, and $R^7$ in Formula (VII) may contain a linear or branched alkyl group, including, but not limited to, a methyl group, an ethyl group, a propyl group, and an isopropyl group. Moreover, $R^2$, $R^5$, $R^6$, and $R^7$ may contain a linear or branched alkenyl group, including, but not limited to, a vinyl group, an allyl group, and a methallyl group. Further, examples of the cycloalkyl group include a cyclohexyl group and an ethyl cyclohexyl group, examples of the cycloalkenyl group include a cyclohexenyl group and an ethyl cyclohexyl group, and examples of the aryl group include a phenyl group and a tolyl group. Still further, $R^5$ may contain an aralkyl group such as a phenethyl group.

In Formula (VII), $R^4$ and $R^8$ may contain a linear or branched alkylene group, including, but not limited to, a methylene group, an ethylene group, a trimethylene group, and a propylene group. In addition, examples of the cycloalkylene group include a cyclohexylene group. Moreover, $R^4$ may contain a linear or branched alkenylene group, including, but not limited to, a vinylene group and a propenylene group. Further, examples of the cycloalkyl alkylene group include a cyclohexyl methylene group, examples of the arylene group include a phenylene group, and examples of the aralkylene group include a xylylene group.

In addition, $R^3$ in Formula (VII) may contain a —[O($R^8$O)$_m$]$_{0.5}$— group, including, but not limited to, a 1,2-ethanedioxy group, a 1,3-propanedioxy group, a 1,4-butanedioxy group, a 1,5-pentanedioxy group, and a 1,6-hexanedioxy group.

The compound represented by Formula (VII) may be prepared by synthesis similar to that described in JP2001505225A, or from a commercially available product such as trade name "NXT," manufactured by Momentive Performance Materials Inc. (3-octanoylthio-propyltriethoxysilane with $R^1=C_2H_5O$, $R^4=C_3H_6$, $R^5=C_7H_{15}$, x=3, y=0, z=0 for Formula (VII)).

Preferred among the compounds represented by Formulas (IV), (V), (VI), and (VII) are those represented by Formulas (V) and (VII).

Note that the hydrous silicate may or may not be modified by a silane coupling agent before being kneaded with the rubber component.

<Other Components>

Preferably, the rubber composition of the present invention is obtained by further blending carbon black as a reinforcing filler. The content of the carbon black is preferably 80 parts by mass or less, and more preferably 60 parts by mass or less, per 100 parts by mass of the rubber component. If the content of the carbon black exceeds 80 parts by mass per 100 parts by mass of the rubber component, the rubber composition may suffer a deterioration in low heat generation property.

When the rubber composition contains the aforementioned carbon black, the total content of the carbon black and the aforementioned hydrous silicate is preferably 150 parts by mass or less, and more preferably 100 parts by mass or less, per 100 parts by mass of the rubber component. The reason is that by setting the total content of the carbon black and the hydrous silicate to be 150 parts by mass or less per 100 parts by mass of the aforementioned rubber component, it becomes possible to guarantee low heat generation of the rubber composition and further improve rolling resistance.

To the rubber composition of the present invention, any additive that is usually added to a general rubber composition may be added so as not to impair the effect of the present invention. For example, any additive that is commonly used in the rubber industry, such as an antioxidant, a vulcanization accelerator, sulfur, zinc oxide, stearic acid, and an antiozonant may be added appropriately.

(Crosslinked Rubber Composition)

A crosslinked rubber composition according to the present invention is obtained by crosslinking the aforementioned rubber composition according to the present invention.

No particular limitation is placed on the crosslinking conditions. For example, vulcanization process may be performed under well-known vulcanization conditions. The vulcanization process is conducted at a temperature of, for example, 100° C. or higher, preferably in the range of 125° C. to 200° C., and more preferably in the range of 130° C. to 180° C.

(Tire)

A tire according to the present invention is obtained by using the aforementioned rubber composition or crosslinked rubber composition as material for any of the tire members. Among such tire members, the composition is particular preferably used for the tread. A tire obtained by using the aforementioned rubber composition or crosslinked rubber composition as material for the tread does not suffer deterioration in rolling resistance and exhibits excellent abrasion resistance. Note that examples of the gas filled in the tire according to the present invention include regular air, air with adjusted partial pressure of oxygen, and an inert gas such as nitrogen.

EXAMPLES

Examples of the present invention will now be described in detail below. The present invention is, however, not limited to the disclosed examples.

Production Example 1: Production of Hydrous Silicate A and its Modification with Surfactant In this case, 65 L of water and 1.25 L of a sodium silicate aqueous solution (160 g/L of $SiO_2$, with a molar ratio $SiO_2/Na_2O$ of 3.3) were added to a 180 L (liters) stainless reactor equipped with a jacket and a stirrer, and heated to 96° C. $Na_2O$ concentration in the resulting solution was 0.015 mol/L.

The solution was held at the temperature of 96° C. and to this solution a sodium silicate aqueous solution as mentioned above, and sulfuric acid (18 mol/L) were added dropwise simultaneously at a flow rate of 750 mL/min and 33 mL/min, respectively. With adjusted flow rates, the reaction solution was neutralized, while $Na_2O$ concentration in the reaction solution was maintained in the range of 0.005 mol/L to 0.035 mol/L. During the reaction, the reaction solution began to grow cloudy and upon lapse of 30 minutes, turned into a gel-like solution in response to an increase in viscosity. The addition was continued and upon lapse of 100 minutes the reaction was terminated. Silica concentration in the resulting solution was 85 g/L. Then, sulfuric acid which was mentioned above was added to the solution until a pH of 3 was reached, whereby a silicate slurry was obtained. The silicate slurry thus obtained was filtrated and washed by water at a filter press to obtain a wet cake of a wet-process hydrous silicate A. Then, an emulsification device was used to prepare a slurry from the wet cake and to this slurry different surfactants were added, mixed under stirring, and subsequently dried with a spray dryer to obtain a wet-process hydrous silicate modified with a surfactant.

Note that the hydrous silicate A thus obtained showed a CTAB adsorption specific surface area of 100 $m^2/g$.

Production Example 2: Production of Hydrous Silicate B

In this case, 89 L of water and 1.70 L of a sodium silicate aqueous solution (160 g/L of $SiO_2$, with a molar ratio $SiO_2/Na_2O$ of 3.3) were added to a 180 L (liters) stainless reactor equipped with a jacket and a stirrer, and heated to 82° C. $Na_2O$ concentration in the resulting solution was 0.015 mol/L.

The solution was held at the temperature of 82° C. and to this solution a sodium silicate aqueous solution as mentioned above and sulfuric acid (18 mol/L) were added dropwise simultaneously at a flow rate of 520 mL/min and 23 mL/min, respectively. With adjusted flow rates, the reaction solution was neutralized, while $Na_2O$ concentration in the reaction solution was maintained in the range of 0.005 mol/L to 0.035 mol/L. During the reaction, the reaction solution began to grow cloudy and upon lapse of 46 minutes, turned into a gel-like solution in response to an increase in viscosity. The addition was continued and upon lapse of 100 minutes the reaction was terminated. Silica concentration in the resulting solution was 60 g/L. Then, sulfuric acid which was mentioned above was added to the solution until a pH of 3 was reached, whereby a silicate slurry was obtained. The silicate slurry thus obtained was filtrated and washed by water at a filter press to obtain a wet cake of a wet-process hydrous silicate B. Then, an emulsification device was used to prepare a slurry from the wet cake and to this slurry different surfactants were added, mixed under stirring, and subsequently dried with a spray dryer to obtain a wet-process hydrous silicate modified with a surfactant.

Note that the hydrous silicate B thus obtained showed a CTAB adsorption specific surface area of 150 $m^2/g$.

Production Example 3: Production of Hydrous Silicate C

In this case, 89 L of water and 1.70 L of a sodium silicate aqueous solution (160 g/L of $SiO_2$, with a molar ratio $SiO_2/Na_2O$ of 3.3) were added to a 180 L (liters) stainless reactor equipped with a jacket and a stirrer, and heated to 75° C. $Na_2O$ concentration in the resulting solution was 0.015 mol/L.

The solution was held at the temperature of 75° C. and to this solution a sodium silicate aqueous solution as mentioned above and sulfuric acid (18 mol/L) were added dropwise simultaneously at a flow rate of 520 mL/min and 23 mL/min, respectively. With adjusted flow rates, the reaction solution was neutralized, while $Na_2O$ concentration in the reaction solution was maintained in the range of 0.005 mol/L to 0.035 mol/L. During the reaction, the reaction solution began to grow cloudy and upon lapse of 46 minutes, turned into a gel-like solution in response to an increase in viscosity. The addition was continued and upon lapse of 100 minutes the reaction was terminated. Silica concentration in the resulting solution was 60 g/L. Then, sulfuric acid which was mentioned above was added to the solution until a pH of 3 was reached, whereby a silicate slurry was obtained. The silicate slurry thus obtained was filtrated and washed by water at a filter press to obtain a wet cake of a wet-process hydrous silicate C. Then, an emulsification device was used to prepare a slurry from the wet cake and to this slurry different surfactants were added, mixed under stirring, and subsequently dried with a spray dryer to obtain a wet-process hydrous silicate modified with a surfactant.

Note that the hydrous silicate C thus obtained showed a CTAB adsorption specific surface area of 200 $m^2/g$.

In addition, carbon content was measured using a solid carbon analyzer ("EMIA-110" manufactured by Horiba Ltd.), which measures carbon content by combusting organic matter contained in a stream of oxygen and detecting the amount of $CO_2$ produced by an infrared sensing device. Specifically, 0.05 g of a sample was analyzed by the carbon analyzer with a furnace temperature of 1250° C. to measure the carbon content thereof.

Formulations A to C

Tables 1 to 3 show Formulations A to C.

TABLE 1

| Formulation A (parts by mass) | |
|---|---|
| SBR *1 | 100 |
| Carbon Black *2 | 15 |
| Hydrous Silicate *3 | 75 |
| Organic Silicon *4 | 7 |
| Aromatic Oil | 36 |
| Stearic Acid | 2 |
| Antioxidant 6C *5 | 1 |
| Zinc Oxide | 3 |
| Vulcanization Accelerator DPG *6 | 1 |
| Vulcanization Accelerator DM *7 | 1 |
| Vulcanization Accelerator NS *8 | 1 |
| Sulfur | 1.5 |

TABLE 2

| Formulation B (parts by mass) | |
|---|---|
| SBR *1 | 100 |
| Hydrous Silicate *3 | 50 |
| Organic Silicon *4 | 5 |

TABLE 2-continued

| Formulation B (parts by mass) | |
|---|---|
| Aromatic Oil | 10 |
| Stearic Acid | 2 |
| Antioxidant 6C *5 | 1 |
| Zinc Oxide | 3 |
| Vulcanization Accelerator DPG *6 | 1 |
| Vulcanization Accelerator DM *7 | 1 |
| Vulcanization Accelerator NS *8 | 1 |
| Sulfur | 1.5 |

TABLE 3

| Formulation C (parts by mass) | |
|---|---|
| SBR *1 | 100 |
| Hydrous Silicate *3 | 85 |
| Organic Silicon *9 | 5 |
| Aromatic Oil | 20 |
| Stearic Acid | 2 |
| Antioxidant 6C *5 | 1 |
| Zinc Oxide | 3 |
| Vulcanization Accelerator DPG *6 | 1 |
| Vulcanization Accelerator DM *7 | 1 |
| Vulcanization Accelerator NS *8 | 1 |
| Sulfur | 1.5 |

*1 Styrene butadiene rubber, #1500, manufactured by JSR Corporation
*2 SEAST® KH (N339) manufactured by Tokai Carbon Co., Ltd.
*3 Any one of hydrous silicates A to C produced by the production examples above
*4 NXT® manufactured by Momentive Performance Materials Inc.
*5 N-(1,3-dimethylbutyl)-N'-phenyl-p-phenylenediamine, NOCRAC 6C, manufactured by Ouchi Shinko Chemical Industrial Co., Ltd.
*6 Diphenylguanidine, NOCCELER D, manufactured by Ouchi Shinko Chemical Industrial Co., Ltd.
*7 benzothiazyl disulfide, NOCCELER DM-P, manufactured by Ouchi Shinko Chemical Industrial Co., Ltd.
*8 N-t-butyl-2-benzothiazylsulphenamide, NOCCELER NS-P, manufactured by Ouchi Shinko Chemical Industrial Co., Ltd.
*9 Bis(3-(triethoxysilyl)propyl)tetrasulfide, Si69, manufactured by Evonik Degussa Corporation Example 1: Samples A1 to A6, B1 to B6, and C1 to C6

The components shown in any one of Formulations A to C were mixed and kneaded according to a conventional method to prepare rubber composition samples. Then, each of the rubber compositions thus obtained was applied as tire tread rubber and subjected to vulcanization.

In this case, the hydrous silicate A was used as hydrous silicate for each sample. Emulgen 705 (manufactured by Kao Corporation) was used as a nonionic surfactant, OS Saop (manufactured by Kao Corporation) as an anionic surfactant, and Kohtamin 60 W (manufactured by Kao Corporation) as a cationic surfactant. For samples A1 to A4, B1 to B4, and C1 to C4, surfactants were added prior to kneading with rubber components, whereas for samples A5, B5, and C5, surfactants were added at the time of kneading with rubber components. The surfactant content per 100 parts by mass of the rubber component is also shown in Table 4.

Example 2: Samples A7 to A12, B7 to B12, and C7 to C12

The components shown in any one of Formulations A to C were mixed and kneaded according to a conventional method to prepare rubber composition samples. Then, each of the rubber compositions thus obtained was applied as tire tread rubber and subjected to vulcanization.

In this case, the hydrous silicate B was used as hydrous silicate for each sample. Emulgen LS-110 (manufactured by Kao Corporation) was used as a nonionic surfactant, Neopelex G-15 (manufactured by Kao Corporation) as an anionic surfactant, and Acetamin 24 (manufactured by Kao Corporation) as a cationic surfactant. For samples A7 to A10, B7 to B10, and C7 to C10, surfactants were added prior to kneading with rubber components, whereas for samples A12, B12, and C12, surfactants were added at the time of kneading with rubber components. The surfactant content per 100 parts by mass of the rubber component is also shown in Table 5.

Example 3: Samples A13 to A18, B13 to B18, and C13 to C18

The components shown in any one of Formulations A to C were mixed and kneaded according to a conventional method to prepare rubber composition samples. Then, each of the rubber compositions thus obtained was applied as tire tread rubber and subjected to vulcanization.

In this case, the hydrous silicate B was used as hydrous silicate for each sample. Emulgen 705 (manufactured by Kao Corporation) was used as a nonionic surfactant, Latemul WX as an anionic surfactant, and Kohtamin 60 W as a cationic surfactant. For samples A13 to A16, B13 to B16, and C13 to C16, surfactants were added prior to kneading with rubber components, whereas for samples A18, B18, and C18, surfactants were added at the time of kneading with rubber components. The surfactant content per 100 parts by mass of the rubber component is also shown in Table 6.

(Evaluation)

These rubber composition samples were used to produce prototype pneumatic tires according to a conventional method. Prototype tire size was 195/65R15.

Each of the prototype tires produced was subjected to the following performance test.

(1) Abrasion Resistance

Measurement was made of the remaining groove depth of prototype tires which attached to a vehicle after a 20,000 km run for abrasion resistance evaluation. Evaluation results are shown in Table 4 as being indexed with a score of 100 representing the remaining groove depths of samples A5, B5, C5, in Table 5 as being indexed with a score of 100 representing the remaining groove depths of samples A11, B11, C11, and in Table 6 as being indexed with a score of 100 representing the remaining groove depths of samples A17, B17, C17, where a larger index indicates better abrasion resistance.

(2) Rolling Resistance

A uniaxial drum tester for measuring rolling resistance was used in an indoor environment to evaluate rolling resistance of each prototype tire under the condition of 80 km/h. Evaluation results are shown in Table 4 as being indexed with a score of 100 representing the rolling resistances of samples A5, B5, C5, in Table 5 as being indexed with a score of 100 representing the rolling resistances of samples A11, B11, C11, and in Table 6 as being indexed with a score of 100 representing the rolling resistances of samples A17, B17, C17, where a larger index indicates a smaller rolling resistance and a better result.

TABLE 4

|  | A1 | A2 | A3 | A4 | A5 | A6 | B1 | B2 | B3 | B4 |
|---|---|---|---|---|---|---|---|---|---|---|
|  | Inventive Example | | | | Comparative Example | | Inventive Example | | | |
|  | Formulation A | | | | | | Formulation B | | | |
| Surfactant | nonionic | nonionic | anionic | cationic | n/a | nonionic (directly added to rubber composition) | nonionic | nonionic | anionic | cationic |
| Content | — | — | — | — | — | 0.5 wt % | — | — | — | — |
| Carbon Content | 0.4 wt. % | 0.7 wt. % | 0.3 wt. % | 0.4 wt. % | — | — | 0.4 wt. % | 0.7 wt. % | 0.3 wt. % | 0.4 wt. % |
| Abrasion Resistance | 112 | 113 | 107 | 116 | 100 | 99 | 120 | 119 | 107 | 116 |
| tanD | 100 | 101 | 100 | 101 | 100 | 98 | 102 | 100 | 101 | 100 |

|  | B5 | B6 | C1 | C2 | C3 | C4 | C5 | C6 |
|---|---|---|---|---|---|---|---|---|
|  | Comparative Example | | Inventive Example | | | | Comparative Example | |
|  | Formulation B | | Formulation C | | | | | |
| Surfactant | n/a | nonionic (directly added to rubber composition) | nonionic | nonionic | anionic | cationic | n/a | nonionic (directly added to rubber composition) |
| Content | — | 0.5 wt % | — | — | — | — | — | 0.5 wt % |
| Carbon Content | — | — | 0.4 wt. % | 0.7 wt. % | 0.3 wt. % | 0.4 wt. % | — | — |
| Abrasion Resistance | 100 | 101 | 120 | 120 | 110 | 118 | 100 | 99 |
| tanD | 100 | 98 | 98 | 99 | 100 | 100 | 100 | 99 |

TABLE 5

|  | A7 | A8 | A9 | A10 | A11 | A12 | B7 | B8 | B9 | B10 |
|---|---|---|---|---|---|---|---|---|---|---|
|  | Inventive Example | | | | Comparative Example | | Inventive Example | | | |
|  | Formulation A | | | | | | Formulation B | | | |
| Surfactant | nonionic | nonionic | anionic | cationic | n/a | nonionic (directly added to rubber composition) | nonionic | nonionic | anionic | cationic |
| Content | — | — | — | — | — | 0.5 wt % | — | — | — | — |
| Carbon Content | 0.4 wt. % | 0.7 wt. % | 0.3 wt. % | 0.4 wt. % | — | — | 0.4 wt. % | 0.7 wt. % | 0.3 wt. % | 0.4 wt. % |
| Abrasion Resistance | 115 | 115 | 107 | 115 | 100 | 101 | 118 | 119 | 106 | 116 |
| tanD | 98 | 101 | 97 | 100 | 100 | 98 | 102 | 99 | 101 | 102 |

|  | B11 | B12 | C7 | C8 | C9 | C10 | C11 | C12 |
|---|---|---|---|---|---|---|---|---|
|  | Comparative Example | | Inventive Example | | | | Comparative Example | |
|  | Formulation B | | Formulation C | | | | | |
| Surfactant | n/a | nonionic (directly added to rubber composition) | nonionic | nonionic | anionic | cationic | n/a | nonionic (directly added to rubber composition) |
| Content | — | 0.5 wt % | — | — | — | — | — | 0.5 wt % |
| Carbon Content | — | — | 0.4 wt. % | 0.7 wt. % | 0.3 wt. % | 0.4 wt. % | — | — |
| Abrasion Resistance | 100 | 102 | 119 | 116 | 111 | 117 | 100 | 101 |
| tanD | 100 | 102 | 100 | 101 | 99 | 102 | 100 | 103 |

TABLE 6

| | A13 | A14 | A15 | A16 | A17 | A18 Comparative Example | B13 | B14 | B15 | B16 |
|---|---|---|---|---|---|---|---|---|---|---|
| | | Inventive Example | | | | | | Inventive Example | | |
| | Formulation A | | | | | | Formulation B | | | |
| Surfactant | nonionic | nonionic | anionic | cationic | n/a | nonionic (directly added to rubber composition) | nonionic | nonionic | anionic | cationic |
| Content | — | — | — | — | — | 0.5 wt % | — | — | — | — |
| Carbon Content | 0.4 wt. % | 0.7 wt. % | 0.3 wt. % | 0.4 wt. % | — | — | 0.4 wt. % | 0.7 wt. % | 0.3 wt. % | 0.4 wt. % |
| Abrasion Resistance | 114 | 116 | 108 | 114 | 100 | 101 | 117 | 120 | 110 | 115 |
| tanD | 101 | 100 | 101 | 100 | 100 | 98 | 102 | 100 | 99 | 98 |

| | B17 | B18 Comparative Example | C13 | C14 | C15 | C16 | C17 | C18 Comparative Example |
|---|---|---|---|---|---|---|---|---|
| | | | | Inventive Example | | | | |
| | Formulation B | | Formulation C | | | | | |
| Surfactant | n/a | nonionic (directly added to rubber composition) | nonionic | nonionic | anionic | cationic | n/a | nonionic (directly added to rubber composition) |
| Content | — | 0.5 wt % | — | — | — | — | — | 0.5 wt % |
| Carbon Content | — | — | 0.4 wt. % | 0.7 wt. % | 0.3 wt. % | 0.4 wt. % | — | — |
| Abrasion Resistance | 100 | 99 | 116 | 115 | 112 | 114 | 100 | 98 |
| tanD | 100 | 101 | 100 | 97 | 101 | 101 | 100 | 99 |

The results shown in Tables 4 to 6 revealed that the samples of inventive examples all gave better results, particularly in respect of abrasion resistance, than the samples of comparative examples. The inventor believes that this is because addition of the surfactant to the rubber composition and controlling of the carbon content to be 1 mass % or less contributed to the improved dispersibility of the hydrous silicate and better abrasion resistance. It is also noticed that samples A6, B6, C6, A12, B12, C12, A18, B18, and C18, which are comparative examples where the surfactant was added at the time of kneading hydrous silicate with the rubber component, showed no improvement in abrasion resistance. This proves the importance of modifying hydrous silicate with a surfactant before kneading the hydrous silicate with a rubber component.

INDUSTRIAL APPLICABILITY

According to the present invention, it is possible to provide a rubber composition that offers excellent abrasion resistance without deteriorating rolling resistance and a crosslinked rubber composition obtained by crosslinking the rubber composition. Thus, a high-performance pneumatic tire having excellent abrasion resistance as compared to the conventional art may be provided by using the rubber composition or the crosslinked rubber composition as material.

The invention claimed is:

1. A method for producing a rubber composition obtained by blending a rubber component, hydrous silicate and a surfactant, comprising
    modifying the hydrous silicate by the surfactant before blending the hydrous silicate with the rubber component by adding the surfactant to a slurry which is obtained by emulsifying the hydrous silicate, wherein the content of the surfactant to modify the hydrous silicate is 0.05 parts by mass to 0.8 parts by mass per 100 parts by mass of the hydrous silicate, and
    the rubber component is at least one rubber selected from natural rubber and diene-based synthetic rubber.

2. The method according to claim 1, wherein the hydrous silicate has a carbon content of 1 mass % or less.

3. The method according to claim 1, wherein the hydrous silicate has a cetyltrimethylammonium bromide (CTAB) adsorption specific surface are of 50 $m^2/g$ to 300 $m^2/g$.

4. The method according to claim 1, wherein the content of the hydrous silicate is 10 parts by mass to 150 parts by mass per 100 parts by mass of the rubber component.

5. The method according to claim 1, wherein the surfactant is a nonionic surfactant.

6. The method according to claim 1, wherein the surfactant is a cationic surfactant.

* * * * *